United States Patent
Maeda et al.

(10) Patent No.: US 9,947,146 B2
(45) Date of Patent: Apr. 17, 2018

(54) INFORMATION PROCESSING SYSTEM FOR ELECTRIC TWO-WHEELED VEHICLE, ELECTRIC TWO-WHEELED VEHICLE, ELECTRIC EQUIPMENT UNIT, AND KEY FOR ELECTRIC TWO-WHEELED VEHICLE

(71) Applicant: PANASONIC INTELLECTUAL PROPERTY MANAGEMENT CO., LTD., Osaka (JP)

(72) Inventors: Tomoko Maeda, Osaka (JP); Kaoru Kudou, Osaka (JP); Masayuki Fujioka, Kyoto (JP); Keita Sakai, Osaka (JP); Takashi Ishimura, Hyogo (JP); Susumu Fukushima, Osaka (JP); Nobuhiko Mutoh, Osaka (JP); Kazunari Takahashi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/209,446

(22) Filed: Jul. 13, 2016

(65) Prior Publication Data
US 2016/0321845 A1 Nov. 3, 2016

Related U.S. Application Data

(63) Continuation of application No. PCT/JP2015/000192, filed on Jan. 19, 2015.

(30) Foreign Application Priority Data

Jan. 21, 2014 (JP) ................................. 2014-008829

(51) Int. Cl.
*B62J 3/00* (2006.01)
*B62J 6/00* (2006.01)
(Continued)

(52) U.S. Cl.
CPC ............... *G07C 5/008* (2013.01); *B62M 6/45* (2013.01); *G06Q 50/30* (2013.01); *G07C 5/006* (2013.01);
(Continued)

(58) Field of Classification Search
CPC ...... B60R 25/2018; B62J 99/00; G07C 5/008; G07C 5/006; G07C 5/085; H04B 5/0056; H04B 5/0037
(Continued)

(56) References Cited

U.S. PATENT DOCUMENTS

2008/0303629 A1* 12/2008 Yamagiwa .......... B60R 25/2018
340/5.6
2013/0027052 A1* 1/2013 Matsumoto .............. B62J 99/00
324/511
(Continued)

FOREIGN PATENT DOCUMENTS

JP 2008-226041 A 9/2008
JP 2008226041 A * 9/2008
(Continued)

OTHER PUBLICATIONS

International Search and Written Opinion issued in International Patent Application No. PCT/JP2015/000192, dated Mar. 31, 2015; with partial English translation.

*Primary Examiner* — Hoi Lau
(74) *Attorney, Agent, or Firm* — McDermott Will & Emery LLP

(57) ABSTRACT

The present disclosure makes it possible to perform a failure diagnosis of an electric two-wheeled vehicle easily, conveniently, and immediately. The electric two-wheeled vehicle includes an electric equipment unit having an IC tag and a host unit. The host unit is capable of communicating with the IC tag, and obtains failure information of the electric equip-
(Continued)

ment unit while electric power is supplied from the battery to the electric equipment unit. The information communication terminal obtains the failure information by communicating with the electric two-wheeled vehicle in a non-contact manner, and transmits the failure information to the server via the network. The server performs a failure diagnosis on the electric two-wheeled vehicle based on the failure information.

18 Claims, 8 Drawing Sheets

(51) Int. Cl.
    *G07C 5/00*     (2006.01)
    *B62M 6/45*     (2010.01)
    *G06Q 50/30*     (2012.01)
    *G07C 5/08*     (2006.01)
    *H04B 5/00*     (2006.01)

(52) U.S. Cl.
    CPC ........... *G07C 5/085* (2013.01); *H04B 5/0031* (2013.01); *H04B 5/0037* (2013.01); *H04B 5/0056* (2013.01)

(58) Field of Classification Search
    USPC ...... 340/5.6, 432, 5.61–5.67, 572.1; 324/511
    See application file for complete search history.

(56) References Cited

U.S. PATENT DOCUMENTS

2015/0036166 A1*   2/2015   Kadota ................ H04N 1/0009
                                                        358/1.14
2016/0337550 A1*   11/2016   Izumi ................. H04N 1/32374
2017/0351469 A1*   12/2017   Kadota ................. G06F 3/1238

FOREIGN PATENT DOCUMENTS

JP       2008-302843 A     12/2008
JP       2008302843 A   * 12/2008   ......... B60R 25/2018
JP       2013-032028 A     2/2013

\* cited by examiner

INFORMATION PROCESSING SYSTEM FOR ELECTRIC TWO-WHEELED VEHICLE, ELECTRIC TWO-WHEELED VEHICLE, ELECTRIC EQUIPMENT UNIT, AND KEY FOR ELECTRIC TWO-WHEELED VEHICLE

CROSS REFERENCE TO RELATED APPLICATION

This application is a U.S. continuation application of PCT International Patent Application Number PCT/JP2015/000192 filed on Jan. 19, 2015, claiming the benefit of priority of Japanese Patent Application Number 2014-008829 filed on Jan. 21, 2014, the entire contents of which are hereby incorporated by reference.

BACKGROUND OF THE INVENTION

1. Technical Field

The present disclosure relates to information processing systems for electric two-wheeled vehicles, and particularly to an information processing system suitable for diagnosing a failure in an electric two-wheeled vehicle.

2. Description of the Related Art

Apparatuses for diagnosing bicycle electric equipment unit systems in which a plurality of electric equipment components are connected have been conventionally known (see Japanese Unexamined Patent Application Publication No. 2013-32028). In a conventional diagnosis device, an electric equipment component disposed at an end of a plurality of electric equipment components connected in series via electric power line communication and a communication adaptor are connected using electric power line communication, and in a state where the communication adaptor and a management system are connected using a USB cable, the management system performs a failure diagnosis for each of the electric equipment components and other information processing regarding the electric equipment component.

SUMMARY

In such a conventional failure diagnosis device, the management system such as a personal computer and the communication adaptor need to be connected wired using the USB cable. For this reason, there is a need to bring the management system to a place at which a bicycle electric equipment system that is a diagnosis target is present or bring the bicycle electric equipment system to a place at which the management system is present instead. This requires a large number of processes for the preparation, which disables execution of an immediate failure diagnosis and other information processing.

In addition, when a battery is failed, or when the battery is exhausted, no electric power is supplied to each of the electric equipment components in the bicycle electric equipment system. In this case, it is impossible to perform any failure diagnosis and other information processing.

In view of this, a failure diagnosis system for electric two-wheeled vehicle or an information processing system according to an aspect of the present disclosure includes: an electric two-wheeled vehicle; an information communication terminal configured to communicate with the electric two-wheeled vehicle in a non-contact manner; and a server configured to communicate with the information communication terminal via a network, the electric two-wheeled vehicle including: an electric equipment unit; and a battery configured to supply electric power to the electric equipment unit, the electric equipment unit including: an IC tag; and a host controller, the IC tag including: an antenna; a non-contact communication unit; a contact communication unit; and a non-volatile storage unit, the IC tag being configured to receive supply of electric power by causing the non-contact communication unit to receive, via the antenna, an electric wave transmitted from outside of the electric two-wheeled vehicle, the host controller being configured to: communicate with the IC tag via the contact communication unit; obtain predetermined information regarding the electric two-wheeled vehicle; and store the predetermined information into the non-volatile storage unit, the information communication terminal being configured to: obtain the predetermined information irrespective of whether or not there is supply of electric power from the battery by communicating with the electric two-wheeled vehicle in a non-contact manner: and transmit the predetermined information to the server via the network, and the server performing predetermined processing based on the predetermined information.

In addition, an electric two-wheeled vehicle according to an aspect of the present disclosure includes: an electric equipment unit; and a battery configured to supply electric power to the electric equipment unit, the electric equipment unit including: an IC tag; and a host controller, the IC tag including: an antenna; a non-contact communication unit; a contact communication unit; and a non-volatile storage unit, the IC tag being configured to receive, via the antenna, supply of electric power by causing the non-contact communication unit to receive an electric wave transmitted from outside, the host controller being configured to: communicate with the IC tag via the contact communication unit; obtain predetermined information regarding the electric two-wheeled vehicle while electric power is supplied from the battery to the electric equipment unit; store the predetermined information into the non-volatile storage unit; and, cause the predetermined information stored in the non-volatile storage unit to be read out to outside in a non-contact manner irrespective of whether there is supply of electric power from the battery.

In addition, an electric equipment unit according to an aspect of the present disclosure is configured to supply electric power by a battery, and includes: an IC tag; and a host controller, the IC tag including: an antenna; a non-contact communication unit; a contact communication unit; and a non-volatile storage unit, the IC tag being configured to receive supply of electric power by causing the non-contact communication unit to receive, via the antenna, an electric wave transmitted from outside, the host controller being configured to: communicate with the IC tag via the contact communication unit; obtain predetermined information regarding the electric equipment unit while electric power is supplied from the battery; store the predetermined information into the non-volatile storage unit; and, cause the predetermined information stored in the non-volatile storage unit to be read out to outside in a non-contact manner irrespective of whether there is supply of electric power from the battery.

In addition, a key for an electric two-wheeled vehicle according to an aspect of the present disclosure includes an IC tag including: an antenna; a non-contact communication unit; a contact communication unit; and a non-volatile storage unit, the IC tag being configured to: receive supply of electric power by causing the non-contact communication unit to receive, via the antenna, an electric wave transmitted from outside of the electric two-wheeled vehicle; and communicate, via the contact communication unit, with an electric equipment unit included in a host controller configured to receive supply of electric power by a battery, and the host controller being configured to: obtain predetermined information regarding the electric two-wheeled vehicle while electric power is supplied from the battery to the host controller; store the predetermined information into the non-volatile storage unit; and cause the predetermined information stored in the non-volatile storage unit to be read out to outside in a non-contact manner irrespective of whether there is supply of electric power from the battery.

The failure diagnosis system for the electric two-wheeled vehicle according to the present disclosure makes it possible to perform non-contact communication between the electric two-wheeled vehicle that is a target for a failure diagnosis or information processing and the information communication terminal, thereby obtaining failure information or predetermined information. Therefore, it is possible to perform the failure diagnosis or information processing for the electric two-wheeled vehicle easily, conveniently, and immediately.

In addition, while electric power is being supplied from the battery to the electric equipment unit, it is possible to obtain the failure information or the predetermined information of the electric equipment unit, store the failure information or the predetermined information into the non-volatile storage unit, and transmit the failure information or the predetermined information stored in the non-volatile storage unit to the information communication terminal using electric power that is supplied by electric waves from outside. In this way, even when the battery fails or the battery is exhausted, it is possible to perform the failure diagnosis or predetermined information processing, based on failure information or predetermined information obtained immediately before the failure occurs or the battery is exhausted.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Embodiment 1

Hereinafter, Embodiment 1 of the present disclosure is described with reference to FIGS. 1 to 5.

(1) Overall Configuration of System

Figure 1:
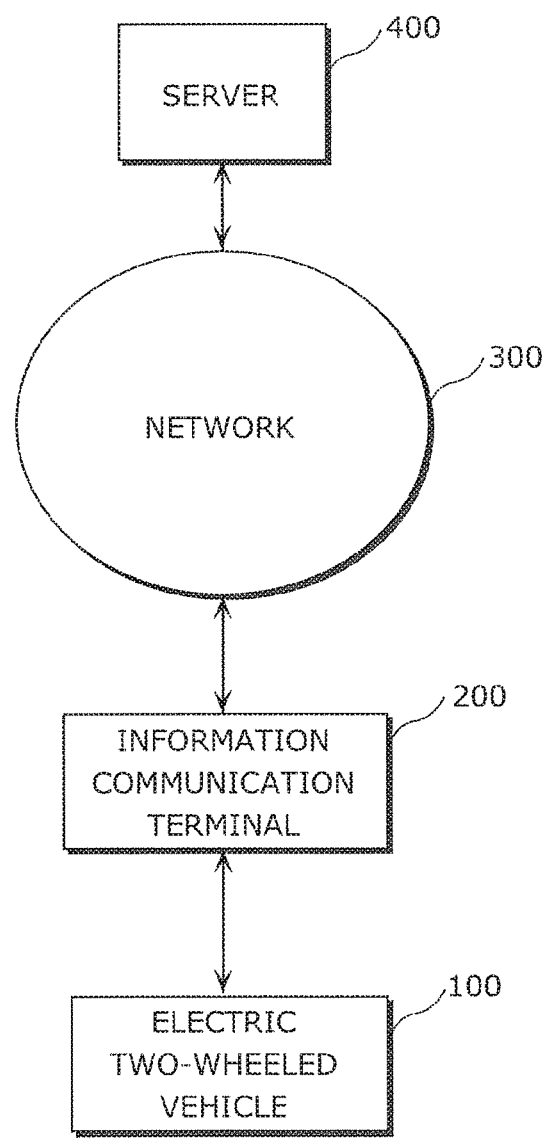
FIG. 1 is a diagram illustrating an overall configuration of a system.
Figure 2:
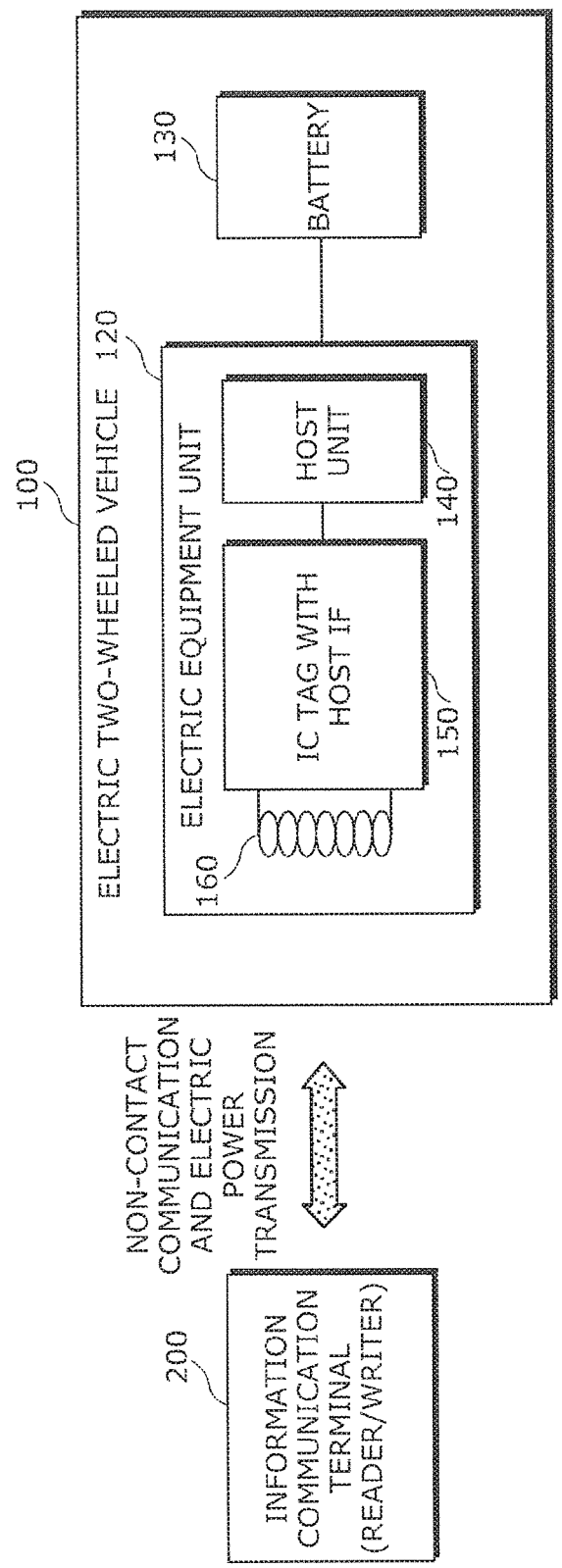
FIG. 2 is a diagram illustrating configurations of an electric two-wheeled vehicle and an information communication terminal.
Figure 3:
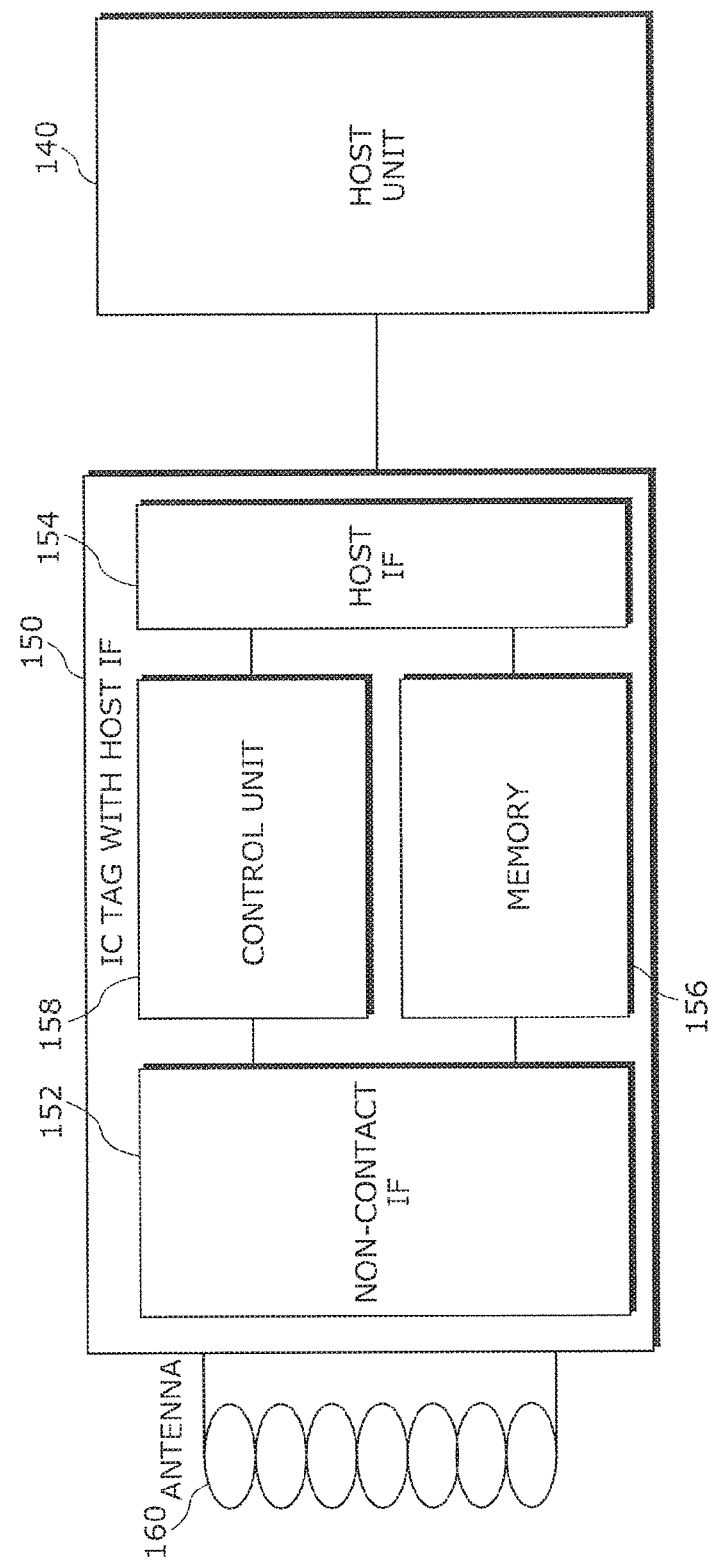
FIG. 3 is a diagram illustrating configurations of an IC tag and a host controller.
Figure 4:
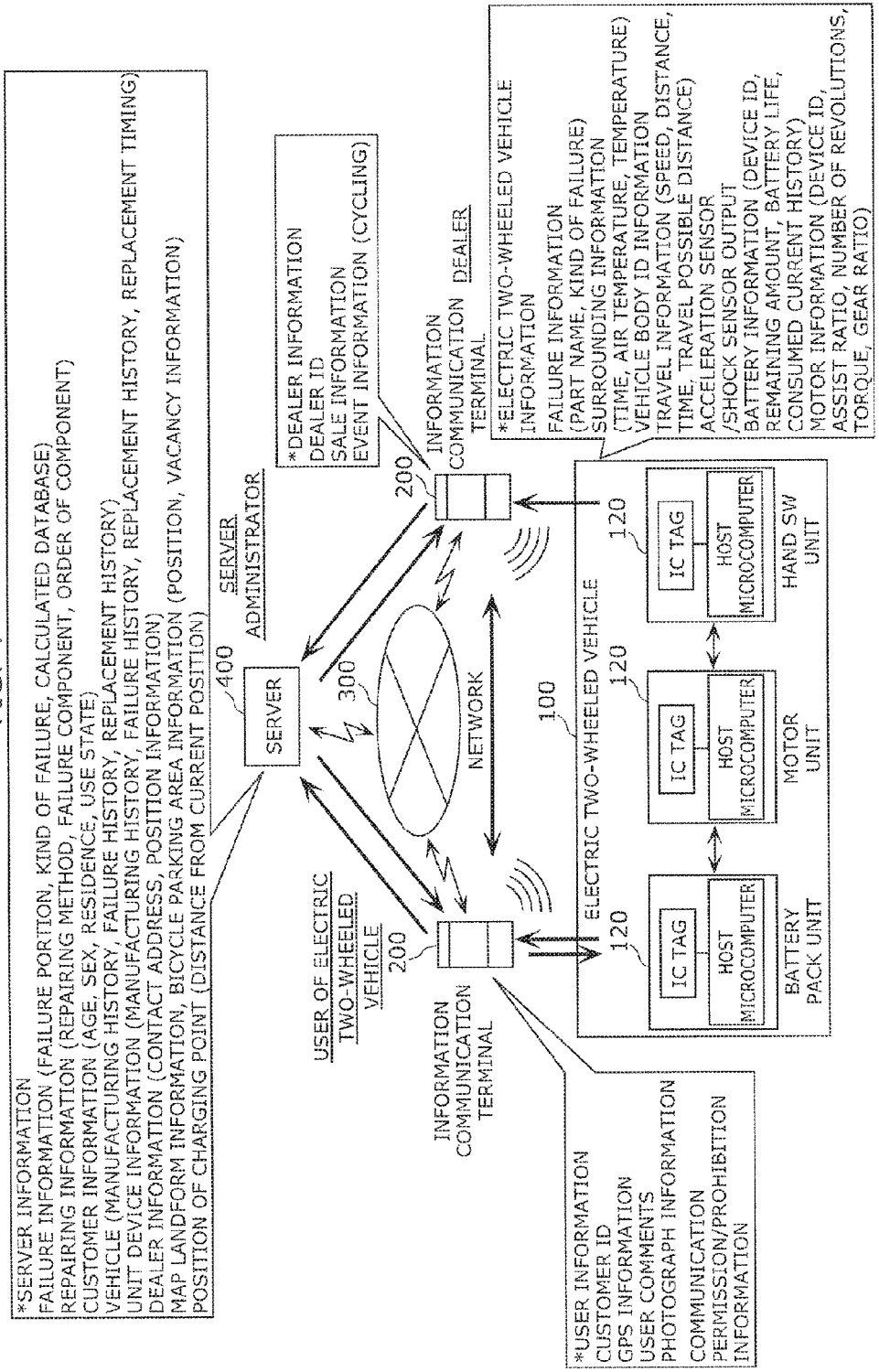
FIG. 4 is a diagram illustrating information stored in a server, an information communication terminal, and an electric two-wheeled vehicle.
Figure 5:
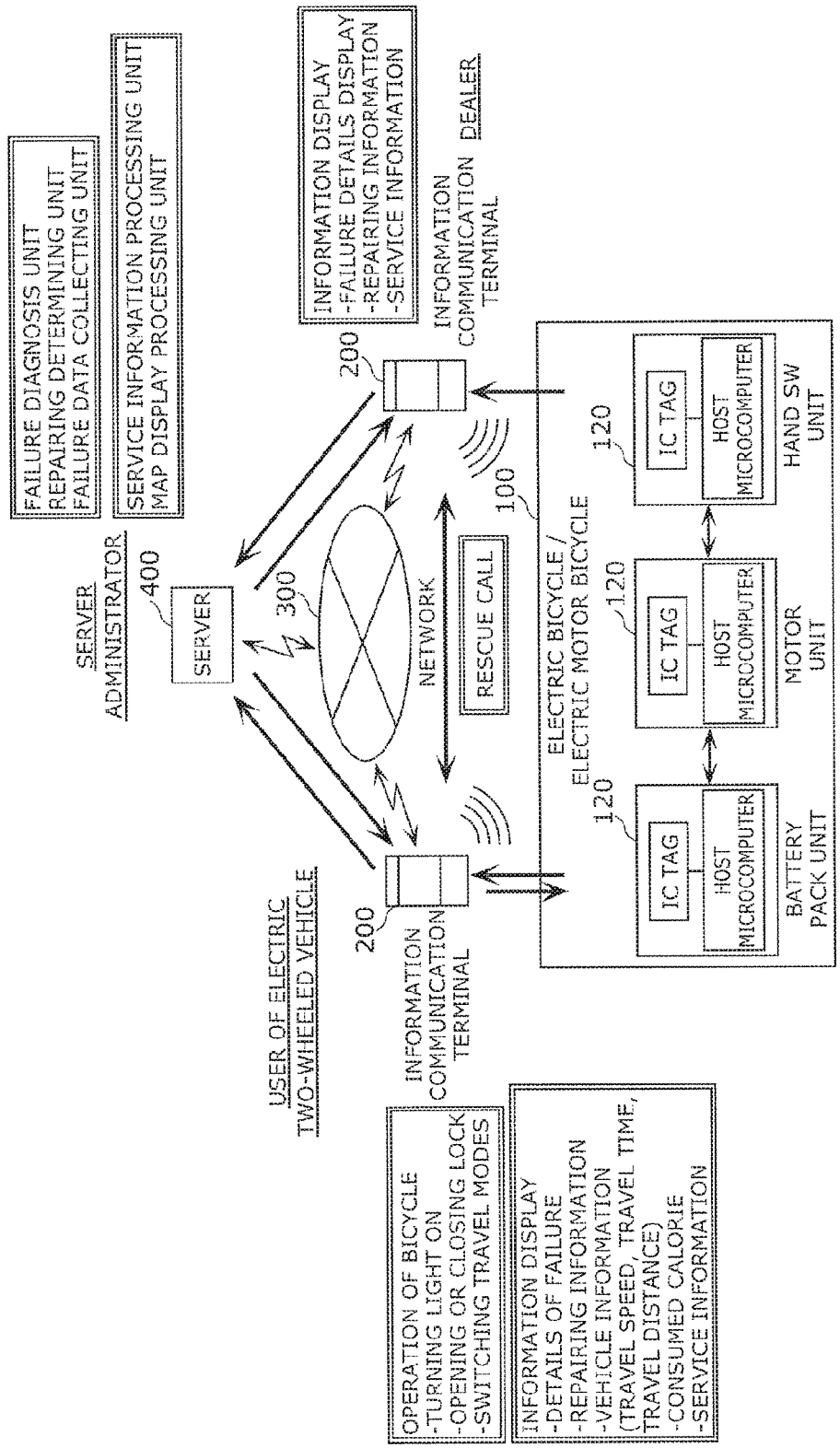
FIG. 5 is a diagram illustrating processing performed in a server, an information communication terminal, and an electric two-wheeled vehicle.

FIG. 1 illustrates an overall configuration of the system according to the present disclosure. The system according to the present disclosure is an information processing system for an electric two-wheeled vehicle (here, a failure diagnosis system), and includes electric two-wheeled vehicle 100, information communication terminal 200, network 300, and server 400. Stated differently, the system includes electric two-wheeled vehicle 100, information communication terminal 200 configured to communicate with electric two-wheeled vehicle 100 in a non-contact manner, and server 400 configured to communicate with information communication terminal 200 via network 300. FIG. 2 illustrates configurations of an electric two-wheeled vehicle and an information communication terminal. FIG. 3 illustrates configurations of an IC tag and a host controller. It is to be noted that information stored in and processing performed by each of server 400, information communication terminal 200, and electric two-wheeled vehicle 100 are illustrated in FIGS. 4 and 5.

(Electric Two-Wheeled Vehicle)

Electric two-wheeled vehicle 100 may be any vehicle having two wheels driven by an electric motor used as a motive power source. It is to be noted that such a vehicle is not always driven by only an electric motor. The electric motor may be used for the purpose of assisting human power.

As illustrated in FIG. 2, electric two-wheeled vehicle 100 includes one or more electric equipment units 120 and battery 130. Electric equipment units 120 are, as non-limiting examples, a battery unit, a motor unit, and a hand switch unit. Battery 130 may be either outside or inside of electric equipment unit 120. When battery 130 is included in electric equipment unit 120, electric equipment unit 120 is referred to as a battery unit. In addition, an acceleration sensor or a shock sensor may be included in any of electric equipment units 120.

At least one of electric equipment units 120 includes host unit (host controller) 140, IC tag 150 with a non-contact IF (hereinafter, IC tag) illustrated in FIG. 3. The standard to which IC tag 150 conforms may be any available one. As non-limiting examples, non-contact interface standards include ISO/IEC 14443 Type A, ISO/IEC 14443 Type B, JISX6319-4, ISO/IEC 21481, and ISO/IEC 18092.

Electric equipment units 120 are connected to be able to communicate with each other, and communicate with each other according to a non-limiting communication mode, for example, I2C or UART specifications.

When a plurality of electric equipment units 120 are included, each of electric equipment units 120 may include IC tag 150 or one or more of electric equipment units 120 may not include IC tag 150. Each of electric equipment units 120 which does not include IC tag 150 may be capable of communicating with the host controller of a corresponding one of electric equipment units 120 which include IC tag 150, and may be able to share IC tag 150 with the corresponding one of electric equipment units 120 which include IC tag 150.

IC tag 150 includes non-contact IF 152, host IF 154, memory 156, and control unit 158. Non-contact IF 152 is a communication interface for performing non-contact communication with a reader/writer such as information communication terminal 200 located outside. Non-contact IF 152 has antenna 160 connected thereto, and performs communication processing with the reader/writer such as information communication terminal 200 located outside.

Non-contact IF 152 is an example of a non-contact communication unit, and includes: a rectifier circuit; a demodulator circuit; a modulator circuit; an analog circuit such as a clock reproduction circuit; digital circuits for coding data to be transmitted or received, and performing frame detection and generation on the data, and digital circuits such as a cyclic redundancy check (CRC) circuit; and a transmission and reception buffer (not illustrated) for temporarily storing data (to be) transmitted or received.

In addition, non-contact IF 152 detects presence or absence of a magnetic field that is stronger than a predetermined threshold value, and notifies host unit 140 of the result of the detection via host IF 154. Non-contact IF 152 obtains electric motor power from the reader/writher such as information communication terminal 200 using electric waves. Electric waves are used, for example, in an electromagnetic induction mode. Upon receiving the notification that electric waves have been detected, host unit 140 may supply an electric power source voltage to IC tag 150.

Host IF 154 is an example of a non-contact communication unit, and a communication interface for performing wired communication with host unit 140. Host IF 154 has a communication line connected thereto for transmitting or receiving electric power source voltage VDD, transmission signal TX, and reception signal RX, and performs communication processing with host unit 140. Host IF 154 includes an input and output circuit, a communication protocol processing circuit, a transmission and reception buffer, etc. (not illustrated).

Memory 156 may be a non-volatile storage unit configured to temporarily store (record) data in communication between host unit 140 and the reader/writer such as information communication terminal 200. The non-volatile storage unit is configured with a non-volatile memory which maintains data stored therein even after electric power is OFF. In addition, memory 156 may be used for the purpose of recording data that should be always stored in IC tag 150.

Non-contact IF 152 includes the transmission and reception buffer for temporarily storing data received from information communication terminal 200 or data to be transmitted. Memory 156 is different in kind from the transmission and reception buffer, and is used as what is called a proxy for host unit 140 when seen from information communication terminal 200. It is to be noted that memory 156 is not always used for the purpose of functioning as a proxy for host unit 140. Host unit 140 may use memory 156 included in IC tag 150, as a non-volatile memory. In this case, as described earlier, memory 156 records the data to be always stored in IC tag 150.

Control unit 158 obtains a command for instructing access to data from one of host unit 140 and the reader/writer such as information communication terminal 200 to the other, and performs processing. Control unit 158 is connected to non-contact IF 152, host IF 154, and memory 156.

Control unit 158 has at least a non-contact communication mode and a contact communication mode. More specifically, control unit 158 determines a communication mode specified by a command obtained from the reader/writher such as information communication terminal 200. When determining that the non-contact communication mode is specified as a communication mode, control unit 158 accesses the data in memory 156 according to the command, and transmits a response signal that is a response to the access to the data in memory 156 to the reader/writher such as information communication terminal 200.

When determining that the contact communication mode is specified as a communication mode (in other words, a command is obtained from host unit 140 via host IF 154), control unit 158 reads data from an area in memory 156 in the case of obtaining a command instructing data reading, and writes data into a predetermined area in memory 156 in the case of obtaining a command instructing data writing.

Control unit 158 may further has a tunnel mode. When determining that the tunnel mode is specified as a communication mode, control unit 158 accesses data in host unit 140 according to the command, and transmits a response that is a response signal corresponding to the access to the data in host unit 140 to the reader/writher such as information communication terminal 200.

In this way, electric equipment unit 120 includes IC tag 150 and host unit 140. IC tag 150 includes antenna 160, a non-contact communication unit (non-contact IF 152), a contact communication unit (host IF 154), and a non-volatile storage unit (memory 156). IC tag 150 is configured to receive supply of electric power by receiving electric waves transmitted from outside of electric two-wheeled vehicle 100 via antenna 160 and using non-contact IF 152. Host unit 140 is configured to communicate with IC tag 150 via host IF 154, obtains predetermined information regarding electric two-wheeled vehicle 100 (for example, failure information regarding electric equipment unit 120), and stores the predetermined information into memory 156.

(Information Communication Terminal)

Information communication terminal 200 may have any form as long as it is capable of communicating information with server 400 via network 300, and may be of a mobile type that can be carried by a user. In addition, the mode for communicating with network 300 is not particularly limited, and may be a wireless mode or a non-contact mode. Wireless communication modes include NFC, Wi-Fi, Bluetooth (registered trademark), etc. as non-limiting examples. A plurality of information communication terminals 200 may be present.

In addition, information communication terminal 200 includes a non-contact interface capable of communicating with IC tag 150, and has a function as the reader/writher to IC tag 150. The non-contact interface standards supported may include, as non-limiting examples, ISO/IEC 14443 Type A, ISO/IEC 14443 Type B, JISX6319-4, ISO/IEC 21481, and ISO/IEC 18092.

Information communication terminal 200 includes information regarding a user stored therein. The user of information communication terminal 200 is, for example, a purchaser of electric two-wheeled vehicle 100 or a dealer of electric two-wheeled vehicle 100. In the case of the purchaser of electric two-wheeled vehicle 100, customer ID (customer identification) and GPS information are stored. In the case of the dealer of electric two-wheeled vehicle 100, dealer ID is stored.

In addition, in the case where information communication terminal 200 is a smart phone, a tablet terminal, or the like which can use a social network service, the purchaser of electric two-wheeled vehicle 100 can transmit a photograph image, comments to information provided by other people, communication permission/prohibition information, etc to server 400 or another information communication terminal 200 via network 300, and the dealer of electric two-wheeled vehicle 100 can transmit sale information, cycling information, etc. in the same manner.

In addition, information communication terminal 200 may be capable of operating electric two-wheeled vehicle 100, for example, by turning light on, opening or closing a lock, switching travel modes, etc. through communication with electric two-wheeled vehicle 100. In addition, information communication terminal 200 includes a display unit such as a display, and is capable of displaying vehicle information such as details of a failure, repairing information, a travel speed, travel time, a travel distance, etc. calories consumed by the user, dealer's service information through communication with electric two-wheeled vehicle 100 and server 400. In addition, information communication terminal 200 is capable of communicating between information communication terminals 200 without intervention of network 300, or through another network. In this way, the dealer of electric two-wheeled vehicle 100 can make a rescue call to a user of electric two-wheeled vehicle 100.

(Server)

Server 400 may have any form as long as it is capable of communicating information with information communication terminal 200 via network 300. In addition, server 400 includes a failure diagnosis unit, a repairing determining unit, a failure data collecting unit, an information storage unit, a service information processing unit, a map display processing unit, and other information processing unit.

In addition, the information storage unit stores therein: failure information (a failure portion, the kind of failure, and a calculated database), repairing information (a repairing method, a failure component, and order of a component), customer information (age, sex, a residence, and a use state), a vehicle (a manufacturing history, a failure history, and a replacement history), unit device information (a manufacturing history, a failure history, a replacement history, and a replacement timing), dealer information (a contact address, and position information), map landform information, bicycle parking area information (a position, and vacancy information), and the position of a charging point (the distance from a current position).

(Network)

A network used here is the Internet as a non-limiting example, and may be any network having any scale and topology and supporting any connection mode and communication protocol that allow connection between a computer functioning as server 400 and information communication terminal 200.

(1) Operation Performed when Electric Two-Wheeled Vehicle is Used

When electric two-wheeled vehicle 100 is used, electric power is supplied from battery 130 to each of electric equipment units 120, host unit 140 such as a microcomputer mounted thereon is activated, and each electric equipment unit 120 is controlled. Through communication with IC tag 150 via host IF 154, information regarding electric two-wheeled vehicle 100 such as the details of control on electric equipment units at the time of travel, the result of control, failure information, and the state of the surrounding environment are stored into a non-volatile storage unit.

Information stored into the non-volatile storage unit includes the following as non-limiting examples: failure information (a part name and the kind of failure) that are examples of predetermined information regarding electric two-wheeled vehicle 100; surrounding information (a time point, an air temperature, and a humidity), vehicle body ID information, travel information (a speed, a distance, and time), output of an accelerator sensor or a shock sensor, battery information (device ID, a battery life, and a consumed current history), motor information (device ID, an assist ratio, the number of revolutions, torque, a gear ratio) etc. In addition, vehicle body ID information and device ID information may be stored in the non-volatile storage unit of IC tag 150 in advance. The information stored in the non-volatile storage unit is maintained even after battery 130 is exhausted.

(3) Failure Diagnosis Processing

Figure 6:
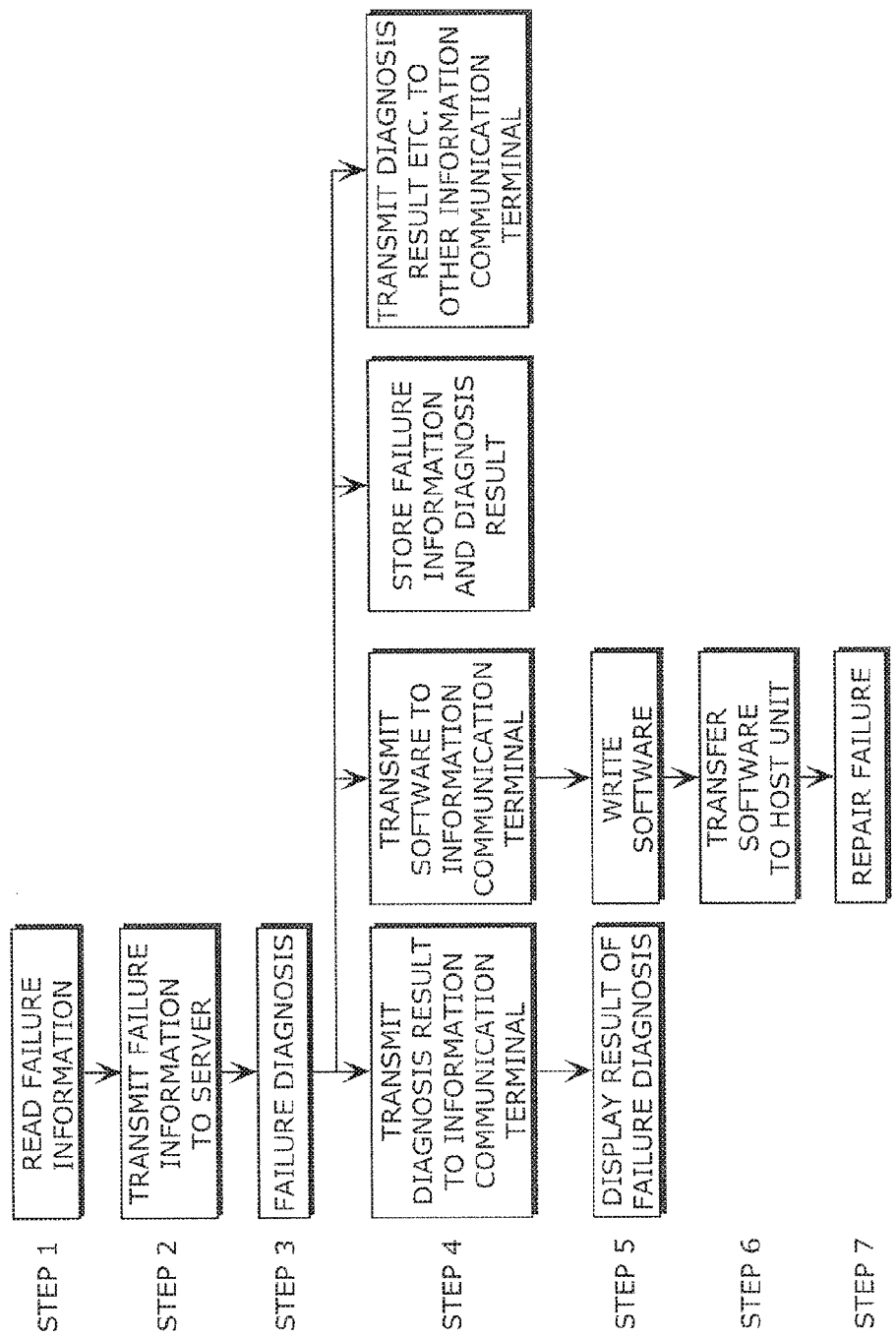
FIG. 6 is a flowchart of failure diagnosis processing for an electric two-wheeled vehicle.

FIG. 6 is a flowchart of failure diagnosis processing for an electric two-wheeled vehicle. Failure diagnosis processing in a failure diagnosis system of electric two-wheeled vehicle 100 of an embodiment is illustrated in FIG. 6, and is performed as below.

As a first step, information communication terminal 200 communicates with electric two-wheeled vehicle 100 in a non-contact manner, and thereby obtains predetermined information. More specifically, failure information is read from the non-volatile storage unit of IC tag 150 included in electric equipment unit 120 of electric two-wheeled vehicle 100 through non-contact communication using information communication terminal 200, and the failure information is stored in information communication terminal 200.

As a second step, information communication terminal 200 obtains predetermined information regarding electric two-wheeled vehicle 100 by communicating with electric two-wheeled vehicle 100 in a non-contact manner, and transmits the predetermined information to server 400 via network 300. More specifically, the failure information read from the non-volatile storage unit of IC tag 150 is transmitted using information communication terminal 200 through communication using network 300. Here, failure information includes a failure part and information identifying the kind of failure, as non-limiting examples.

As a third step, server 400 performs predetermined processing based on predetermined information. More specifically, server 400 performs failure diagnosis that is an example of the predetermined processing, based on the transmitted failure information. Here, in the failure diagnosis, a failure portion, the details of a failure, the cause of the failure, and a repairing method are identified as non-limiting examples from the failure information.

In this way, it is possible to perform an immediate failure diagnosis without connecting wired with a management system such as a personal computer and without requiring a large number of processes for preparation. In addition, it is possible to perform a failure diagnosis even in the cases where a battery is failed, or a battery is exhausted and no electric power is supplied to each of electric equipment components in the electric equipment system for the electric two-wheeled vehicle. Batteries mountable on electric two-wheeled vehicles are limited, and normally no electric two-wheeled vehicle runs with a spare battery. In other words, electric two-wheeled vehicles highly depend on a limited number of batteries. It is extremely useful for a user of such an electric two-wheeled vehicle to be able to perform failure diagnosis even in a state where no electric power is supplied to electric equipment unit 120, in other words, electric equipment unit 120 is turned OFF.

Based on the result of the failure diagnosis executed by server 400, the server administrator may make a contact with information communication terminal 200 of the user of electric two-wheeled vehicle 100, and may directly address the failure. Furthermore, as a fourth step, server 400 may transmit the result of the failure diagnosis (the result of predetermined processing) to information communication terminal 200, and as a fifth step, information communication terminal 200 may display the result of the failure diagnosis into the display unit. In other words, server 400 may transmit the result of the predetermined processing to information communication terminal 200, and information communication terminal 200 may display information based on the result of the predetermined processing. The information based on the result of the predetermined processing includes information regarding at least one of: a replacement timing for the battery; travel distance; rescue call necessity; travel history; analysis for a travel pattern; a failure portion in electric two-wheeled vehicle 100; details of the failure; a cause of the failure; a repairing method; and the electric two-wheeled vehicle.

In this way, the user or the dealer of the electric two-wheeled vehicle can check the failure portion, the details of the failure, the cause of the failure, and the repairing method on a monitor screen of information communication terminal 200 (for example, a mobile phone, a smart phone, or a tablet terminal), and performs repair at a place at which electric two-wheeled vehicle 100 is currently present without requesting on-site service by a manufacturer or a repair shop or bringing the product to the manufacturer or the repair shop.

In addition, as the fourth step, server 400 may transmit the software program identified according to the result of the failure diagnosis to information communication terminal 200. Information communication terminal 200 may write the software program into the non-volatile storage unit in the electric equipment system through non-contact communication as the fifth step, and transfers the written software to host unit 140 in a sixth step, so that the failure is repaired in a seventh step. In other words, the predetermined information is information regarding a failure, the predetermined processing is failure diagnosis processing, and the information processing system is a failure diagnosis system. The server transmits a software program identified according to the result of the failure diagnosis processing to the information communication terminal, and the information communication terminal repairs a failure which has occurred in the electric two-wheeled vehicle through a non-contact communication.

In this way, the user or the dealer of the electric two-wheeled vehicle can have the failure repaired automatically.

In addition, in the case where electric two-wheeled vehicle 100 includes a second electric equipment unit which receives electric power supplied from battery 130, the following processing is performed. The second electric equipment unit includes a second host controller configured to communicate with the host controller (host unit 140). The second host controller is configured to: obtain second predetermined information (for example, failure information) regarding the second electric equipment unit while electric power is supplied from battery 130 to the second electric equipment unit; and store the second predetermined information into the non-volatile storage unit (memory 156) via the host controller. Subsequently, information communication terminal 200 obtains the second predetermined information and transmits the second predetermined information to server 400 via network 300 by communicating with electric two-wheeled vehicle 100 in a non-contact manner. Server 400 performs predetermined processing for electric two-wheeled vehicle 100 based on the second predetermined information.

The failure diagnosis processing in this embodiment may be modified as below.

As a first step, failure information, vehicle body ID information, or unit ID information is read from the non-volatile storage unit of IC tag 150 included in electric equipment unit 120 of electric two-wheeled vehicle 100 through non-contact communication using information communication terminal 200, and the failure information is temporarily stored in information communication terminal 200.

As a second step, information communication terminal 200 transmits the failure information, the vehicle body ID information, or the unit ID information read into non-volatile storage unit to server 400 through communication using network 300. As a third step, server 400 performs failure diagnosis based on the transmitted failure information.

As a fourth step, server 400 stores at least one of the failure information or the failure diagnosis result into a storage unit in association with at least one of the vehicle body ID or the unit ID.

In other words, the non-volatile storage unit stores at least one of vehicle body identification for identifying electric two-wheeled vehicle 100 and unit identification for identifying electric equipment unit 120, and information communication terminal 200 is configured to: obtain at least one of the vehicle body identification and the unit identification by communicating with electric two-wheeled vehicle 100 in a non-contact manner; and transmit the at least one of the vehicle body identification and the unit identification to server 400 via network 300. Server 400 stores the predetermined information in server 400 itself, in association with the at least one of the vehicle body identification and the unit identification.

In this way, it is possible to manage a failure history for each vehicle body or each electric equipment unit 120. For example, it is possible to obtain statistical data of a unit and portion having a high failure frequency. The manufacturer of the electric two-wheeled vehicle can utilize the data for quality improvement in the future. In addition, it is possible to address the trouble in a manufacturing process appropriately by checking and analyzing the failure history and the manufacturing history.

It is to be noted that, in the second step, user ID for identifying the user of information communication terminal 200 may be transmitted to server 400 together with vehicle ID information or unit ID information, or user ID for identifying the user of information communication terminal 200 may be transmitted to server 400 instead of the vehicle ID information or the unit ID information.

The user ID may be any information as long as it makes it possible to uniquely identify the user. For example, if information communication terminal 200 is a mobile phone, the user ID may be a telephone number as a non-limiting example.

In this case, as a fourth step, server 400 stores at least one of the failure information or the result of the failure diagnosis into the storage unit in association with the user ID. Stated differently, information communication terminal 200 is configured to transmit user identification for identifying a user of information communication terminal 200 to server 400 via network 300. Server 400 stores the predetermined information in server 400 itself, in association with the user identification.

In this way, it is possible to manage the failure history for each user. By checking the failure history and replacement history, it is possible to identify a feature of a failure unique to a user, and perform an appropriate treatment. In addition, by analyzing them together with user information such as ages, sexes, residents, use time zones, etc., it is possible to develop products suitable for users in particular user groups.

In the case where other information communication terminals 200 in addition to information communication terminals 200 are connected via network 300 and can communicate with server 400, the failure diagnosis processing in this embodiment may be modified as below.

As a first step, failure information is read from the non-volatile storage unit of IC tag 150 included in electric equipment unit 120 of electric two-wheeled vehicle 100 through non-contact communication using information communication terminal 200, and the failure information is temporarily stored in information communication terminal 200.

As a second step, the user ID for identifying the user of information communication terminal 200 is transmitted to server 400 together with the failure information read into the non-volatile storage unit using information communication terminal 200 through communication using network 300.

As a third step, server 400 performs failure diagnosis based on the transmitted failure information. As a fourth step, server 400 transmits the user ID together with the failure information or the result of the failure diagnosis to other information communication terminal 200 associated with the user ID among other information communication terminals 200 through network 300.

Stated differently, information communication terminal 200 transmits user identification for identifying a user of information communication terminal 200 to server 400 via network 300. Server 400 transmits the user identification with the result of the predetermined processing to an other information communication terminal associated with the user identification via network 300.

For example, if other information communication terminal 200 is used by the dealer of the electric two-wheeled vehicle, the dealer of the electric two-wheeled vehicle can find out the failure portion, the details of the failure, the cause of the failure, and the repairing method for each vehicle body ID and each user. When the electric two-wheeled vehicle has a failure, the dealer can recognize the state timely, and obtains a business opportunity because they can contact the user directly.

In addition, the user can provide the failure information to a particular dealer, and receive an appropriate service immediately.

In the second step, user ID for identifying the user of information communication terminal 200 and position information for identifying the position of information communication terminal 200 may be transmitted to server 400 together with the failure information. In the fourth step, server 400 may transmit the user ID together with the failure information or the result of the failure diagnosis to other information communication terminal 200 associated with the position information among other information communication terminals 200 via network 300. Stated differently, information communication terminal 200 is configured to transmit user identification and position information to server 400 via network 300. The user identification is for identifying a user of information communication terminal 200, and the position information is for identifying a position of information communication terminal 200. Server 400 transmits the user identification with the result of the predetermined processing to an other information communication terminal associated with the position identification via network 300.

For example, if other information communication terminal 200 is used by the dealer of the electric two-wheeled vehicle, the dealer of the electric two-wheeled vehicle can find out the failure portion, the details of the failure, the cause of the failure, and the repairing method for each neighboring user. When electric two-wheeled vehicle 100 has a failure, the dealer can recognize the state timely, and obtains a business opportunity because they can contact the neighboring user directly. In addition, the user can provide the failure information to a neighboring dealer, and receive an appropriate service immediately.

As described above, in this embodiment, the electric two-wheeled vehicle includes the electric equipment unit having the IC tag and the host unit. The host unit is capable of communicating with the IC tag, and obtains the failure information of the electric equipment unit while electric power is supplied from the battery to the electric equipment unit. The information communication terminal obtains the failure information by communicating with the electric two-wheeled vehicle in a non-contact manner, and transmits the failure information to the server via the network. The server performs a failure diagnosis on the electric two-wheeled vehicle based on the failure information. In this way, the failure diagnosis of the electric two-wheeled vehicle is performed easily, conveniently, and immediately.

Embodiment 2

Hereinafter, Embodiment 2 of the present disclosure is described with reference to FIG. 7.

The overall configuration of a system and operations performed when electric two-wheeled vehicle 100 is used are the same as in the system of Embodiment 1.

Figure 7:
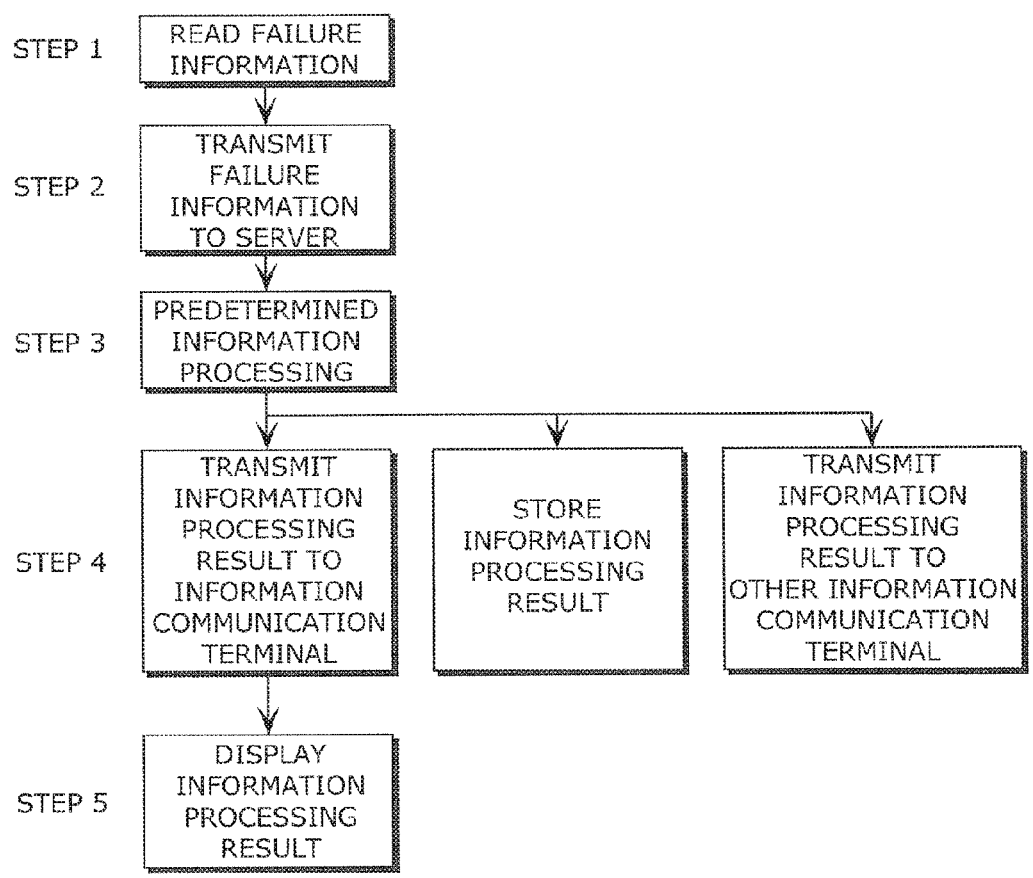
FIG. 7 is a flowchart of information processing for an electric two-wheeled vehicle.

FIG. 7 is a flowchart of information processing for an electric two-wheeled vehicle. Information processing in the information processing system of electric two-wheeled vehicle 100 is illustrated in FIG. 7 and is performed as below according to the present disclosure.

As a first step, predetermined information is read from the non-volatile storage unit of IC tag 150 included in electric equipment unit 120 of electric two-wheeled vehicle 100 through non-contact communication using information communication terminal 200, and the failure information is stored into information communication terminal 200.

As a second step, information communication terminal 200 transmits the predetermined information read into the non-volatile storage unit to server 400 through communication using network 300. The predetermined information here includes the following as non-limiting examples: failure information (a part name and the kind of failure); surrounding information (a time point, an air temperature, and a humidity), vehicle body ID information, travel information (a speed, a distance, and time), output of an accelerator sensor or a shock sensor included in the electric two-wheeled vehicle, battery information (device ID, a battery life, and a consumed current history) of a battery included in the electric two-wheeled vehicle, motor information (device ID, an assist ratio, the number of revolutions, torque, a gear ratio) etc. of a motor included in the electric two-wheeled vehicle.

As a third step, server 400 performs predetermined information processing based on transmitted predetermined information. The predetermined information processing performed here includes the following as non-limiting examples: estimating battery replacement timing based on battery information and travel information; calculating a travel distance from travel information (speed and time); determining whether a rescue call is necessary based on the output from the accelerator sensor or the shock sensor, calculating a travel history based on the motor information, and analyzing a travel pattern based on a consumed current history. The result of the information processing can be utilized for product development and marketing.

In other words, the predetermined information may be information obtained by a device mounted on the electric two-wheeled vehicle.

Furthermore, as a fourth step, server 400 may transmit the result of the predetermined information processing to information communication terminal 200, and as a fifth step, information communication terminal 200 may display the result of the information processing on the display unit.

If the result of the predetermined information processing to be displayed is replacement timing, the user of electric two-wheeled vehicle 100 can make a travel plan in advance.

If the result of the information processing to be displayed is a travel distance, it is possible to check the travel distance without attaching a meter outside of electric two-wheeled vehicle 100. In addition, the travel distance cannot be manipulated because it is based on information inside of electric equipment unit 120. Thus, it is possible to always check accurate travel distance information. Accurate travel distance information may become useful information at the time when electric two-wheeled vehicle 100 is sold and bought as a used product.

In addition, if the result of the information processing to be displayed is whether the rescue call is necessary, the user of electric two-wheeled vehicle 100 can know in advance that contact will be made for having himself/herself rescued.

If the result of the information processing to be displayed is the result of a travel history and a travel pattern, it is possible to know objectively the method of using electric two-wheeled vehicle 100, and utilize the teaching to improve the method of using electric two-wheeled vehicle 100.

In addition, if the result of the information processing to be displayed is the position of a charging point (the distance from a current position), the user of electric two-wheeled vehicle 100 can relievedly make a travel plan according to the remaining amount of battery 130.

The information processing in this embodiment may be modified as below.

As a first step, predetermined information, vehicle body ID information, or unit ID information is read from the non-volatile storage unit of IC tag 150 included in electric equipment unit 120 of electric two-wheeled vehicle 100 through non-contact communication using information communication terminal 200, and the read-out information is temporarily stored in information communication terminal 200.

As a second step, information communication terminal 200 transmits the predetermined information, the vehicle body ID information, or the unit ID information read into the non-volatile storage unit to server 400 through communication using network 300.

As a third step, server 400 performs predetermined information processing based on transmitted predetermined information.

As a fourth step, server 400 stores the result of predetermined information processing into a storage unit in association with at least one of the vehicle body ID or the unit ID.

It is to be noted that, in the second step, user ID for identifying the user of information communication terminal 200 may be transmitted to server 400 together with vehicle ID information or unit ID information. Alternatively, user ID for identifying the user of information communication terminal 200 may be transmitted to server 400 instead of the vehicle body ID information or the unit ID information.

The user ID may be any information as long as it makes it possible to uniquely identify the user. For example, if information communication terminal 200 is a mobile phone, the user ID is a telephone number as a non-limiting example.

In this case, as the fourth step, server 400 stores the result of predetermined information processing into the storage unit in association with the user ID.

In this way, it is possible to mange the result of processing the predetermined information in association with the vehicle body ID information, the unit ID information, or the user ID information. For example, it is possible to manage the replacement frequency, the travel distance, an accident history, and a travel pattern for each vehicle body ID and each customer. Such information can be information for the manufacture of the electric two-wheeled vehicle in determining a product to be developed in the future.

In addition, by analyzing user information such as the age, sex, residence, use time zone, etc., and other information stored in server 400, and the result of information processing, it is possible to develop products suitable for particular user groups and provide suitable services.

In the case where other information communication terminals 200 in addition to information communication terminals 200 are connected via network 300 and can communicate with server 400, the information processing in this embodiment may be modified as below.

As a first step, predetermined information is read from the non-volatile storage unit of IC tag 150 included in electric equipment unit 120 of electric two-wheeled vehicle 100 through non-contact communication using information communication terminal 200, and the predetermined information is temporarily stored into information communication terminal 200.

As a second step, the user ID for identifying the user of information communication terminal 200 is transmitted to server 400 together with the predetermined information read into the non-volatile storage unit using information communication terminal 200 through communication using network 300.

As a third step, server 400 performs predetermined information processing based on transmitted predetermined information.

As a fourth step, server 400 transmits the user ID together with the predetermined information to other information communication terminal 200 associated with the user ID among other information communication terminals 200 through network 300.

For example, information communication terminal 200 is used by the dealer of electric two-wheeled vehicles, the dealer of electric two-wheeled vehicles can find out a replacement frequency, a travel distance, an accident history, and a travel pattern related to battery 130 for each vehicle body ID and each customer. Such information can be information useful for the dealer of electric two-wheeled vehicles in determining products to be sold or services to be provided in the future.

Furthermore, the user of electric two-wheeled vehicle 100 can provide a shop handling electric two-wheeled vehicles with the above information, and can thereby receive an appropriate service immediately.

In the second step, user ID for identifying the user of information communication terminal 200 and position information for identifying the position of information communication terminal 200 may be transmitted to server 400 together with the predetermined information. In the fourth step, server 400 may transmit the user ID together with the result of the predetermined information processing to other information communication terminal 200 associated with the position information among other information communication terminals 200 via network 300.

For example, if other information communication terminal 200 is used by the dealer of electric two-wheeled vehicles, the dealer of the electric two-wheeled vehicle can find out a replacement frequency, a travel distance, an accident history, and a travel pattern of battery 130 of an electric two-wheeled vehicle of a neighboring user. Such information can be information useful for the dealer of electric two-wheeled vehicles in determining products to be sold or services to be provided in the future.

Furthermore, the user of electric two-wheeled vehicle 100 can provide a shop handling electric two-wheeled vehicles with the above information, and can thereby receive an appropriate service immediately.

In addition, modifications as below may be made.

As a first step, predetermined information is read from the non-volatile storage unit of IC tag 150 included in electric equipment unit 120 of electric two-wheeled vehicle 100 through non-contact communication using information communication terminal 200, and the predetermined information is temporarily stored into information communication terminal 200.

As a second step, information communication terminal 200 transmits the predetermined information read into the non-volatile storage unit to server 400 through communication using network 300, and other information communication terminal 200 transmits service information provided by the user of other information communication terminal 200 to server 400 through communication using network 300.

As a third step, server 400 performs predetermined information processing based on transmitted predetermined information.

As a fourth step, server 400 transmits service information according to the result of information processing to other information communication terminal 200 associated with the user ID among other information communication terminals 200, together with the result of the predetermined information processing via network 300.

In this way, the information processing system further includes an other information communication terminal configured to communicate with server 400 via network 300. The other information communication terminal is configured to transmit, to server 400 via network 300, service information regarding a service provided by a user of the other information communication terminal. Server 400 transmits the service information to information communication terminal 200 according to the predetermined processing.

In this way, the user of electric two-wheeled vehicle 100 can receive the service provided by the dealer of electric two-wheeled vehicle appropriately and immediately.

It is to be noted that, in the second step, if the user of other information communication terminals 200 is the user of other electric two-wheeled vehicle 100, photographs captured by the user of other electric two-wheeled vehicle 100, various kinds of comments, and related position information may be transmitted to server 400, and in the third step, server 400 may perform predetermined information processing based on map landform information etc. stored in server 400 together with the transmitted predetermined information.

In this way, for example, the user of other electric two-wheeled vehicle 100 can provide, during cycling, cycling lovers with a community which enables sharing of landscape photographs captured by the user of other electric two-wheeled vehicle 100 in the past, remarks, and recommendation information etc.

Embodiment 3

Hereinafter, Embodiment 3 of the present disclosure is described with reference to FIG. 8.

Figure 8:
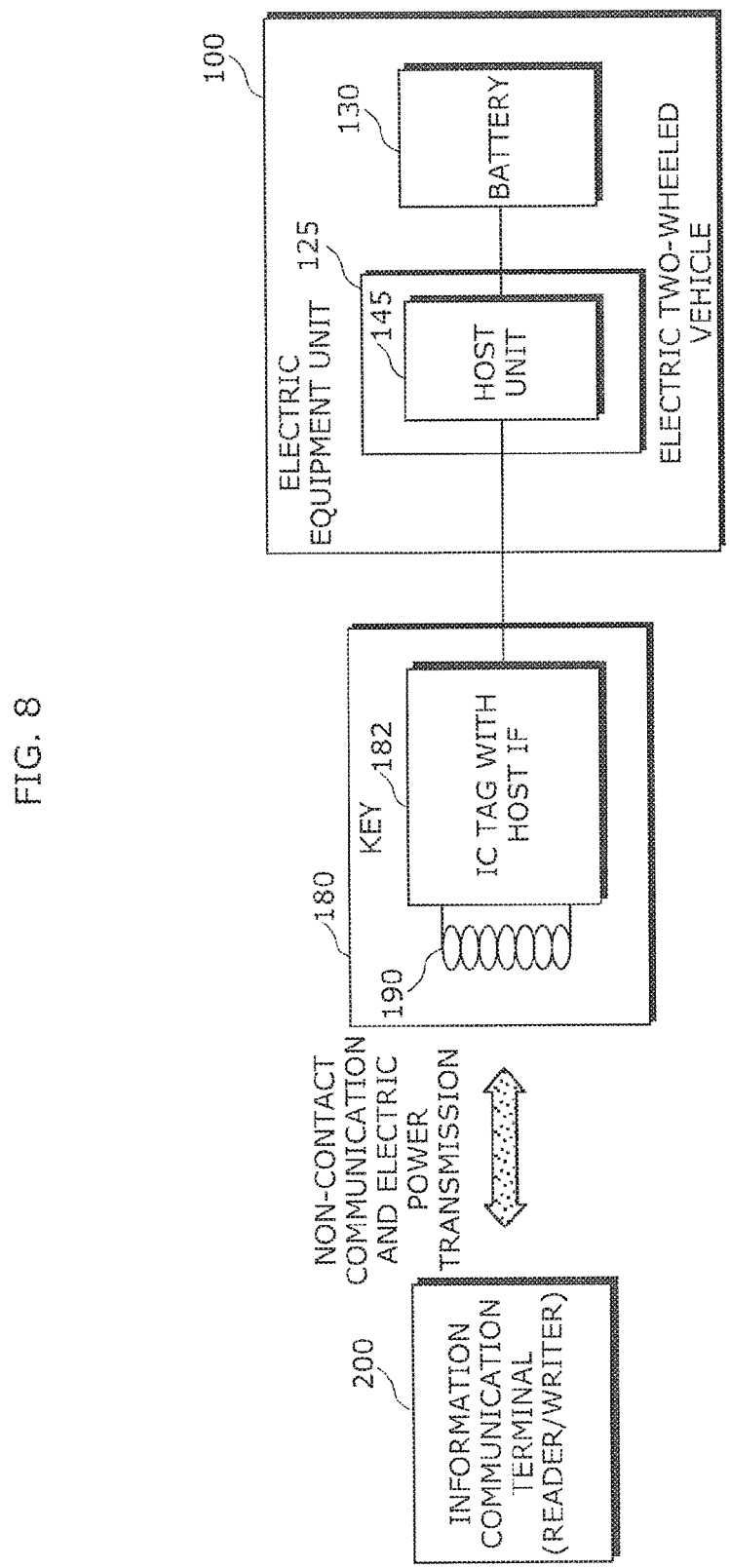
FIG. 8 is a diagram illustrating configurations of an electric two-wheeled vehicle, an electric two-wheeled vehicle key, and an information communication terminal.

FIG. 8 illustrates configurations of an electric two-wheeled vehicle, an electric two-wheeled vehicle key, and an information communication terminal. Electric two-wheeled vehicle 100 in the overall configuration of the system in Embodiment 3 is additionally provided with key 180 having an IC tag included therein.

IC tag 182 included in key 180 includes antenna 190, a non-contact communication unit, a contact communication unit, and a non-volatile storage unit, and is capable of causing the non-contact communication unit to receive electric waves transmitted from outside via antenna 190 and thereby supplying electric power.

IC tag 182 is capable of communicating with electric equipment unit 125 including host unit (host controller) 145 included therein via the contact communication unit. In addition, electric equipment unit 125 is capable of supplying electric power by battery 130.

This key 180 obtains failure information or predetermined information of electric equipment unit 125 while host unit 145 is receiving electric power supplied from battery 130, and stores the failure information or the predetermined information into the non-volatile storage unit.

Operations performed at the time when electric two-wheeled vehicle 100 is used, processing performed when a failure diagnosis is made, and predetermined information processing are the same as those in Embodiments 1 and 2.

In this way, in this embodiment, key 180 of electric two-wheeled vehicle includes IC tag 182, and IC tag 182 includes the antenna, the non-contact communication unit, the contact communication unit, and the non-volatile storage unit. IC tag 182 is configured to: cause the non-contact communication unit to receive electric waves transmitted from outside via the antenna, and thereby receive supply of electric power; and communicate, via the contact communication unit, with an electric equipment unit included in the host controller configured to receive supply of electric power by a battery. The host controller obtains predetermined information regarding the electric two-wheeled vehicle while electric power is being supplied from the battery, and stores predetermined information into the non-volatile storage unit.

In this way, the electric two-wheeled vehicle key suitable for performing a failure diagnosis of the electric two-wheeled vehicle is implemented easily, conveniently, and immediately.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure makes it possible to perform a failure diagnosis on an electric two-wheeled vehicle easily, conveniently, and immediately. Therefore, the present disclosure is useful for increasing the maintenance service level for electric two-wheeled vehicles and reducing cost.

What is claimed is:

1. An information processing system for an electric two-wheeled vehicle, comprising:
    an electric two-wheeled vehicle;
    an information communication terminal configured to communicate with the electric two-wheeled vehicle in a non-contact manner; and
    a server configured to communicate with the information communication terminal via a network,
    the electric two-wheeled vehicle including:
    an electric equipment unit; and
    a battery configured to supply electric power to the electric equipment unit,
    the electric equipment unit including:
    an IC tag; and
    a host controller,
    the IC tag including:
    an antenna;
    a non-contact communication unit;
    a contact communication unit; and
    a non-volatile storage unit,
    the IC tag being configured to receive supply of electric power by causing the non-contact communication unit to receive, via the antenna, an electric wave transmitted from outside of the electric two-wheeled vehicle,
    the host controller being configured to:
    communicate with the IC tag via the contact communication unit;
    obtain predetermined information regarding the electric two-wheeled vehicle; and
    store the predetermined information into the non-volatile storage unit,
    the information communication terminal being configured to:
    obtain the predetermined information irrespective of whether or not there is supply of electric power from the battery by communicating with the electric two-wheeled vehicle in a non-contact manner: and
    transmit the predetermined information to the server via the network, and
    the server performing predetermined processing based on the predetermined information.

2. The information processing system for an electric two-wheeled vehicle, according to claim 1,
    wherein the server transmits a result of the predetermined processing to the information communication terminal, and
    the information communication terminal displays information based on the result of the predetermined processing.

3. The information processing system for an electric two-wheeled vehicle, according to claim 2,
    wherein the information based on the result of the predetermined processing includes information regarding at least one of: a replacement timing for the battery; travel distance; rescue call necessity; travel history; analysis for a travel pattern; a failure portion in the electric two-wheeled vehicle; details of the failure; a cause of the failure; a repairing method; and the electric two-wheeled vehicle.

4. The information processing system for an electric two-wheeled vehicle, according to claim 1,
    wherein the non-volatile storage unit stores at least one of vehicle body identification for identifying the electric two-wheeled vehicle and unit identification for identifying the electric equipment unit,
    the information communication terminal is configured to:
    obtain at least one of the vehicle body identification and the unit identification by communicating with the electric two-wheeled vehicle in a non-contact manner; and
    transmit the at least one of the vehicle body identification and the unit identification to the server via the network, and
    the server stores the predetermined information in the server itself, in association with the at least one of the vehicle body identification and the unit identification.

5. The information processing system for an electric two-wheeled vehicle, according to claim 1,
    wherein the information communication terminal is configured to transmit user identification for identifying a user of the information communication terminal to the server via the network, and
    the server stores the predetermined information in the server itself, in association with the user identification.

6. The information processing system for an electric two-wheeled vehicle, according to claim 1,
    wherein the information communication terminal is configured to transmit user identification for identifying a user of the information communication terminal to the server via the network, and
    the server transmits the user identification with the result of the predetermined processing to an other information communication terminal associated with the user identification via the network.

7. The information processing system for an electric two-wheeled vehicle, according to claim 1,
    wherein the information communication terminal is configured to transmit user identification and position information to the server via the network, the user identification being for identifying a user of the information communication terminal, the position information being for identifying a position of the information communication terminal, and
    the server transmits the user identification with the result of the predetermined processing to an other information communication terminal associated with the position identification via the network.

8. The information processing system for an electric two-wheeled vehicle, according to claim 1, further comprising
    an other information communication terminal configured to communicate with the server via the network,
    wherein the other information communication terminal is configured to transmit, to the server via the network, service information regarding a service provided by a user of the other information communication terminal, and
    the server transmits the service information to the information communication terminal according to the predetermined processing.

9. The information processing system for an electric two-wheeled vehicle, according to claim 1,
    wherein the battery is included in the electric equipment unit.

10. The information processing system for an electric two-wheeled vehicle, according to claim 1,
    wherein the electric two-wheeled vehicle further includes a second electric equipment unit which receives electric power supplied from the battery,
    the second electric equipment unit includes a second host controller configured to communicate with the host controller, the second host controller is configured to:
obtain second predetermined information regarding the second electric equipment unit while electric power is supplied from the battery to the second electric equipment unit; and
store the second predetermined information into the non-volatile storage unit via the host controller,
the information communication terminal is configured to:
obtain the second predetermined information; and
transmit the second predetermined information to the server via the network by communicating with the electric two-wheeled vehicle in a non-contact manner, and
the server performs predetermined processing for the electric two-wheeled vehicle based on the second predetermined information.

11. The information processing system for an electric two-wheeled vehicle, according to claim 1,
wherein the predetermined information is information regarding a failure, the predetermined processing is failure diagnosis processing, and the information processing system is a failure diagnosis system.

12. The information processing system for an electric two-wheeled vehicle, according to claim 1,
wherein the predetermined information is information regarding a failure, the predetermined processing is failure diagnosis processing, and the information processing system is a failure diagnosis system,
the server transmits a software program identified according to a result of the failure diagnosis processing to the information communication terminal, and
the information communication terminal repairs a failure which has occurred in the electric two-wheeled vehicle through a non-contact communication.

13. The information processing system for an electric two-wheeled vehicle, according to claim 1,
wherein the predetermined information is information obtained by a device mounted on the electric two-wheeled vehicle.

14. An electric two-wheeled vehicle comprising:
an electric equipment unit; and
a battery configured to supply electric power to the electric equipment unit,
the electric equipment unit including:
an IC tag; and
a host controller,
the IC tag including:
an antenna;
a non-contact communication unit;
a contact communication unit; and
a non-volatile storage unit,
the IC tag being configured to receive, via the antenna, supply of electric power by causing the non-contact communication unit to receive an electric wave transmitted from outside,
the host controller being configured to:
communicate with the IC tag via the contact communication unit;
obtain predetermined information regarding the electric two-wheeled vehicle while electric power is supplied from the battery to the electric equipment unit;
store the predetermined information into the non-volatile storage unit; and,
cause the predetermined information stored in the non-volatile storage unit to be read out to outside in a non-contact manner irrespective of whether there is supply of electric power from the battery.

15. An electric equipment unit configured to supply electric power by a battery, comprising:
an IC tag; and
a host controller,
the IC tag including:
an antenna;
a non-contact communication unit;
a contact communication unit; and
a non-volatile storage unit,
the IC tag being configured to receive supply of electric power by causing the non-contact communication unit to receive, via the antenna, an electric wave transmitted from outside,
the host controller being configured to:
communicate with the IC tag via the contact communication unit;
obtain predetermined information regarding the electric equipment unit while electric power is supplied from the battery;
store the predetermined information into the non-volatile storage unit; and,
cause the predetermined information stored in the non-volatile storage unit to be read out to outside in a non-contact manner irrespective of whether there is supply of electric power from the battery.

16. A key for an electric two-wheeled vehicle, comprising an IC tag including:
an antenna;
a non-contact communication unit;
a contact communication unit; and
a non-volatile storage unit,
the IC tag being configured to:
receive supply of electric power by causing the non-contact communication unit to receive, via the antenna, an electric wave transmitted from outside of the electric two-wheeled vehicle; and
communicate, via the contact communication unit, with an electric equipment unit included in a host controller configured to receive supply of electric power by a battery, and
the host controller being configured to:
obtain predetermined information regarding the electric two-wheeled vehicle while electric power is supplied from the battery to the host controller;
store the predetermined information into the non-volatile storage unit; and
cause the predetermined information stored in the non-volatile storage unit to be read out to outside in a non-contact manner irrespective of whether there is supply of electric power from the battery.

17. A failure diagnosis system for an electric two-wheeled vehicle, comprising:
an information communication terminal configured to communicate with the electric two-wheeled vehicle in a non-contact manner; and
a server configured to communicate with the information communication terminal via a network,
the electric two-wheeled vehicle including:
an electric equipment unit; and
a battery configured to supply electric power to the electric equipment unit,
the electric equipment unit including:
an IC tag; and
a host controller,
the IC tag including:
an antenna;
a non-contact communication unit;

a contact communication unit; and a non-volatile storage unit, the IC tag being configured to receive supply of electric power by causing the non-contact communication unit to receive, via the antenna, an electric wave transmitted from outside of the electric two-wheeled vehicle, the host controller being configured to:

communicate with the IC tag via the contact communication unit;

obtain information regarding a failure of the electric two-wheeled vehicle; and store the information regarding the failure into the non-volatile storage unit, the information communication terminal being configured to:

obtain the information regarding the failure irrespective of whether or not there is supply of electric power from the battery by communicating with the electric two-wheeled vehicle in a non-contact manner: and transmit the information regarding the failure to the server via the network, and the server performing failure diagnosis processing based on the information regarding the failure.

18. The failure diagnosis system for the electric two-wheeled vehicle, according to claim 17, the server transmitting a software program identified according to a result of the failure diagnosis processing to the information communication terminal, and the information communication terminal repairing a failure which has occurred in the electric two-wheeled vehicle through a non-contact communication.

* * * * *